United States Patent

Kosaraju et al.

[11] Patent Number: 6,129,410
[45] Date of Patent: Oct. 10, 2000

[54] APPARATUS FOR REINFORCING A BODY SIDE PANEL OF A MOTOR VEHICLE

[75] Inventors: Hari K. Kosaraju, Rochester Hills; Eugene M. Schoenherr, Shelby Township; Thomas K. Boyd, Grand Blanc; Patrick H. Geyer, Metamora, all of Mich.

[73] Assignee: Chrysler Corporation, Auburn Hills, Mich.

[21] Appl. No.: 09/076,426

[22] Filed: May 12, 1998

[51] Int. Cl.$^7$ .................................................. B62D 25/02
[52] U.S. Cl. ................ 296/188; 296/203.03; 296/146.11
[58] Field of Search ............................... 296/188, 146.9, 296/146.11, 203.03

[56] References Cited

U.S. PATENT DOCUMENTS

| | | | |
|---|---|---|---|
| 2,860,911 | 11/1958 | Cotter | 296/146.9 X |
| 5,048,887 | 9/1991 | Kunishima et al. | 296/146.9 |
| 5,242,209 | 9/1993 | Yamauchi | 296/188 |
| 5,246,264 | 9/1993 | Yoshii | 296/188 X |
| 5,549,349 | 8/1996 | Corporon et al. | 276/188 |
| 5,599,057 | 2/1997 | Hirahara et al. | 296/188 X |
| 5,624,150 | 4/1997 | Venier | 296/146.11 |
| 5,671,968 | 9/1997 | Masuda et al. | 296/188 |

*Primary Examiner*—Joseph D. Pape
*Attorney, Agent, or Firm*—William J. Coughlin

[57] ABSTRACT

An apparatus for a motor vehicle which reinforces the body side panel comprises an unitarily constructed reinforcement member. The reinforcement member includes first and second hinge mounting portions interconnected by an intermediate portion. The reinforcement member is fixedly secured to the B-pillar and the hinge plates of a passenger door are interconnected to the first and second hinge mounting portions. In one embodiment, the reinforcement member includes first and second spaced apart flanges which extend substantially in an inboard direction. The first and second spaced apart flanges are welded or otherwise securely attached to the B-pillar. Further, in the preferred embodiment, the reinforcement member includes a first tab upwardly extending from the first hinge mounting portion and a second tab downwardly extending from the second hinge mounting portion which provide additional points for securing the reinforcement member to the B-pillar of the body side panel.

16 Claims, 4 Drawing Sheets

APPARATUS FOR REINFORCING A BODY SIDE PANEL OF A MOTOR VEHICLE

BACKGROUND OF THE INVENTION

1. Technical Field

The present invention generally relates to vehicle occupant protection. More particularly, the present invention relates to an apparatus for reinforcing a body side panel of a motor vehicle.

2. Discussion

A motor vehicle is required to satisfy various Federal Motor Vehicle Safety Standards (FMVSS) designed to reduce incidents of occupant injury. For side impact, a static test and a dynamic test is required. In the static test, which is technically a quasi-static test, a ram is slowly forced into a stationary vehicle at a predetermined height. The vehicle door is required to meet minimum specified force-deflection characteristics. In the dynamic test, a moving barrier simulating a striking vehicle impacts a stationary vehicle at a predetermined speed and height.

A variety of techniques have been utilized in the past in attempts to reduce vehicle cost and weight while not adversely impacting vehicle performance relating to occupant protection. For example, it is known to employ a reinforcement attached to the B-pillar to receive side impact loads which strike the vehicle above the sill. Such a reinforcement is intended to retain necessary strength and impact absorbing capabilities while permitting the gauge of material used for other parts of the body side panel to be reduced, thereby reducing material expense.

While known arrangements have proven to be acceptable for satisfying FMVSS requirements and accordingly reducing occupant injuries, they are all subject to improvement. For example, known arrangements for reinforcing the vehicle are typically expensive and add significant weight to the vehicle.

SUMMARY OF THE INVENTION

It is a general object of the present invention to provide a reinforcement for a vehicle body side panel which functions to reduce intrusion into the passenger compartment in the event of a side impact collision.

A related object of the present invention is to provide a B-pillar reinforcement for improving energy management by transferring impact energy through the occupant door hinges.

It is another object of the present invention to provide a B-pillar reinforcement which also functions as a door hinge tapping plate, thereby resulting in cost and weight savings.

It is another object of the present invention to provide a reinforcement for a vehicle body side panel which improves rear door sag.

In one form, the present invention provides a reinforced body side panel for a motor vehicle having a door pivotally mounted thereto through first and second hinge plates. The reinforced body side panel includes a roof-line portion, a sill portion, a B-pillar vertically interconnected with the sill portion and the roof-line portion, and a unitarily constructed reinforcement member. The reinforcement member is secured to the B-pillar and includes first and second hinge attachment portions. The first and second hinge plates are interconnected to the first and second hinge attachment portions, respectively.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
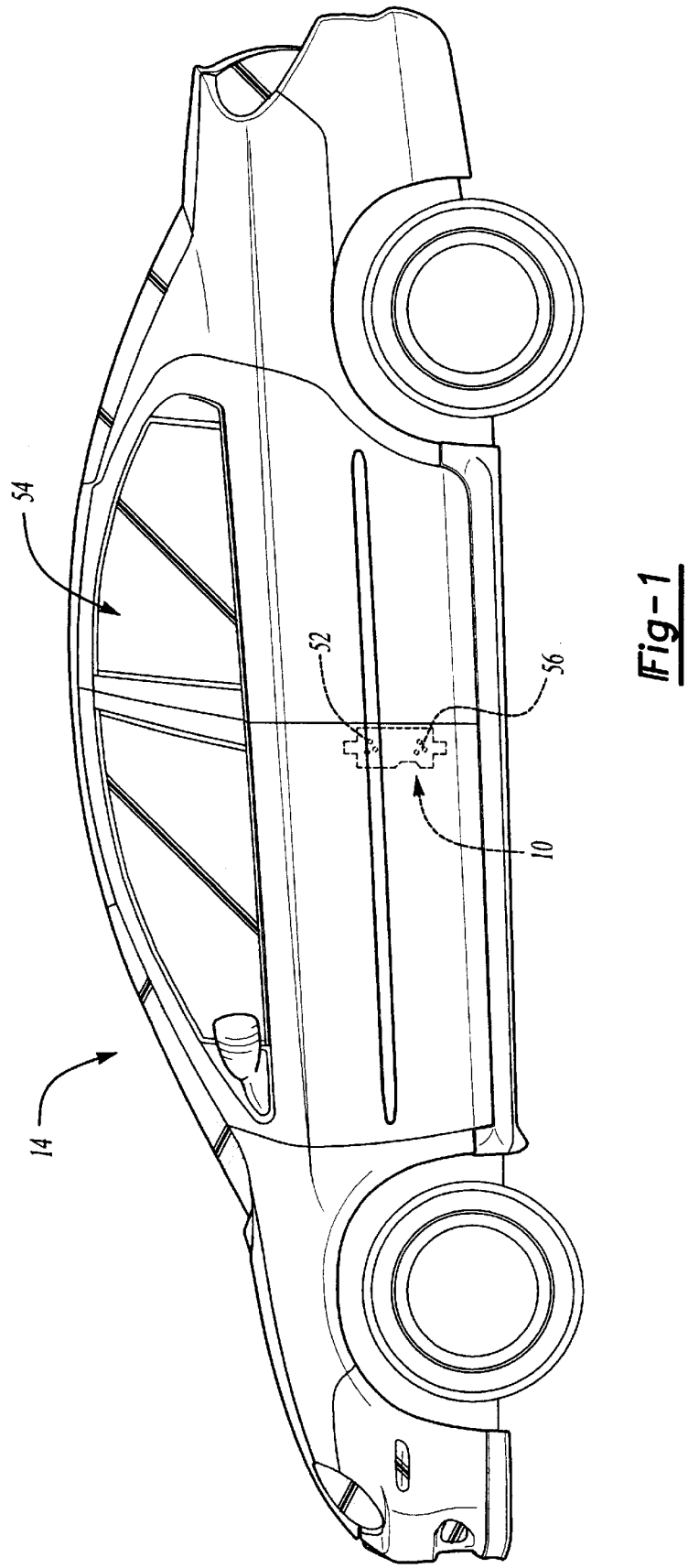
FIG. 1 is an environmental view of an apparatus for reinforcing a body side panel of a motor vehicle constructed in accordance with the teachings of a preferred embodiment of the present invention and shown operatively associated with an exemplary vehicle.
Figure 2:
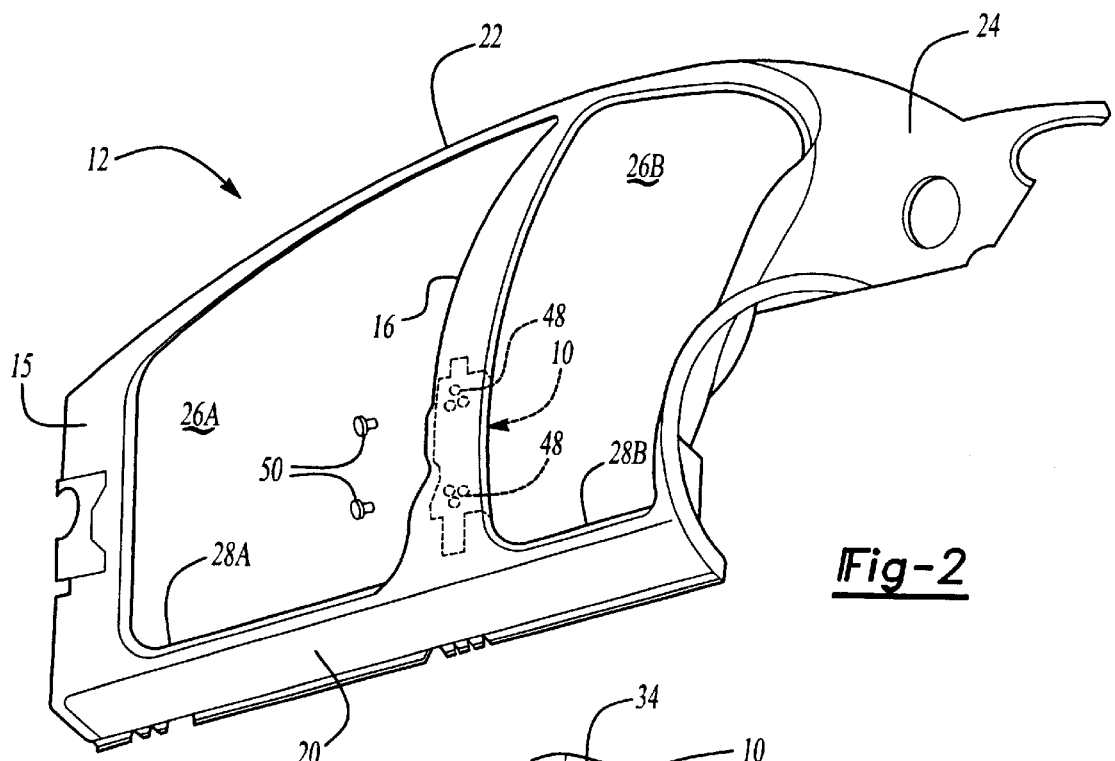
FIG. 2 is a perspective view of a body side panel of the exemplary motor vehicle of FIG. 1, further illustrating the location of the apparatus of the present invention.

Referring initially to FIGS. 1 and 2 of the drawings, there is depicted an apparatus for reinforcing a body side panel of a motor vehicle embodying the concepts of the present invention. The apparatus of the present invention is generally identified in the drawings with reference numeral 10 and is shown in phantom operatively associated with a body side panel 12 of an exemplary motor vehicle 14. It will become apparent below that the teachings of the present invention are not limited to the illustrated body side panel 12 and vehicle 14, and as such are broadly applicable to body side panels for a large range of motor vehicles.

Figure 3:
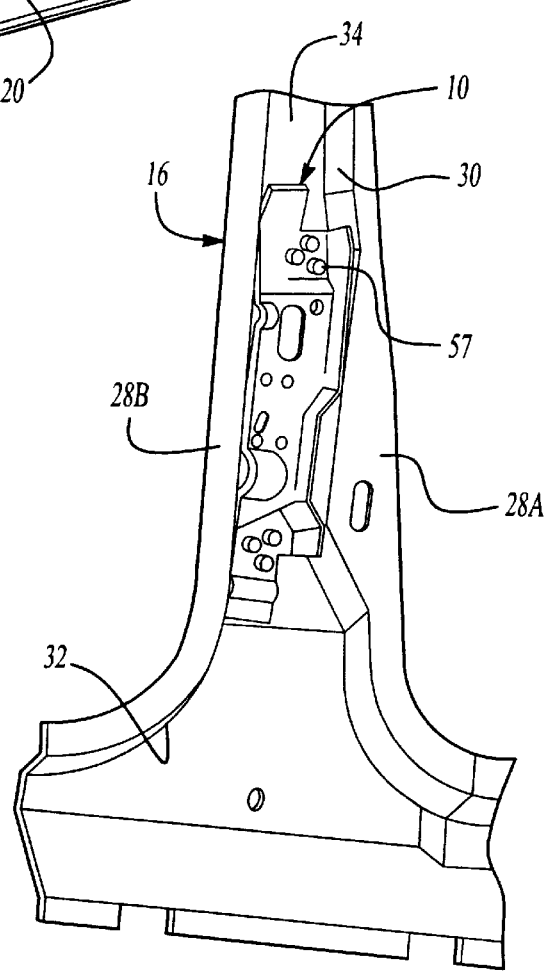
FIG. 3 is an enlarged fragmentary rear perspective view of the body side panel of FIG. 1 further illustrating the apparatus of the present invention.

Prior to addressing the construction and operation of the apparatus 10 of the present invention, a brief understanding of the exemplary body side panel 12 shown in FIGS. 1–3 of the drawings is warranted. The body side panel 12 illustrated is otherwise of conventional construction and shown to generally include an A-pillar 15, a B-pillar 16, a sill 20, a roof line portion 22 and a rear quarter panel portion 24. The body side panel 12 defines front and rear door openings 26A and 26B. Peripheral flanges 28A and 28B partially extend about the door openings 26A and 26B, respectively, and normally function to limit inward movement of the doors. The B-pillar includes first and second spaced apart flanges 30 and 32 which extend in an inboard direction and intersect the peripheral flanges 28A and 28B, respectively. The specific body side panel 12 shown throughout the drawings is intended for use on the driver's side or left side of the motor vehicle 14. It will be appreciated by those skilled in the art that the teachings of the present invention are equally applicable for a passenger's side body side panel (not shown). In this regard, the passenger side body side panel and apparatus would be a substantial mirror image of that shown in FIG. 2.

Figure 4:
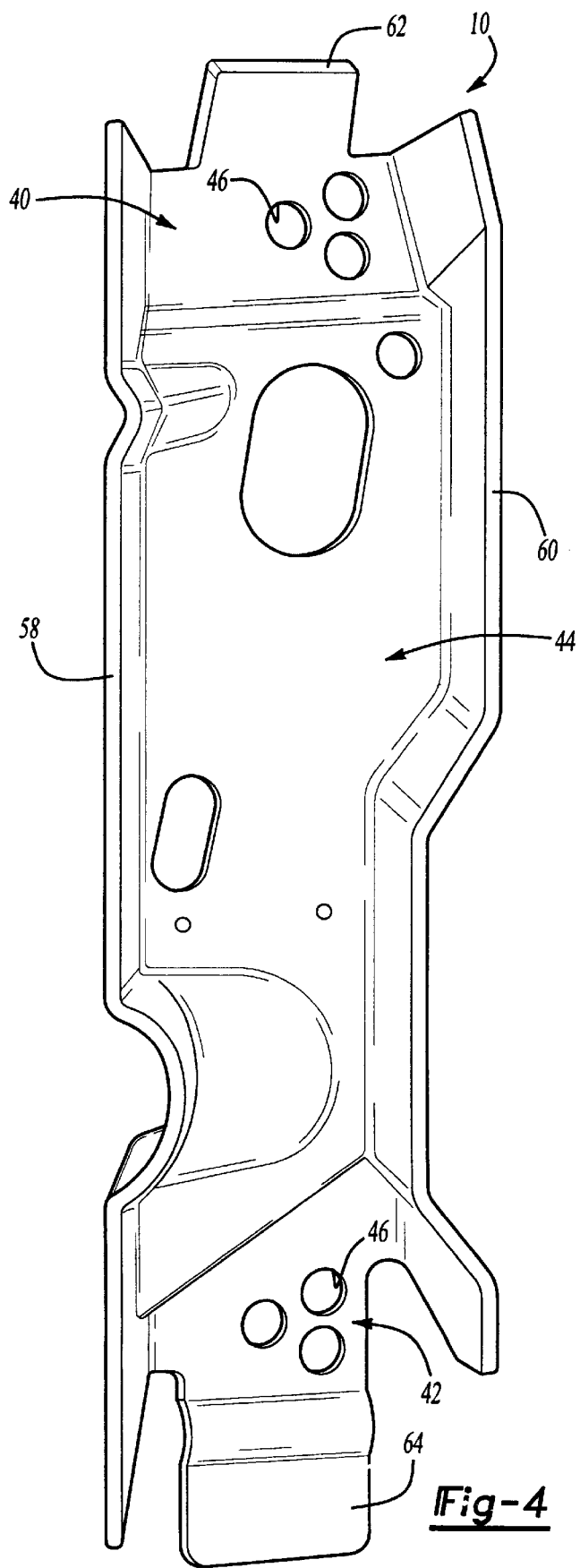
FIG. 4 is an enlarged front perspective view of the apparatus of FIG. 1 shown removed from the body side panel for purposes of illustration.
Figure 5:
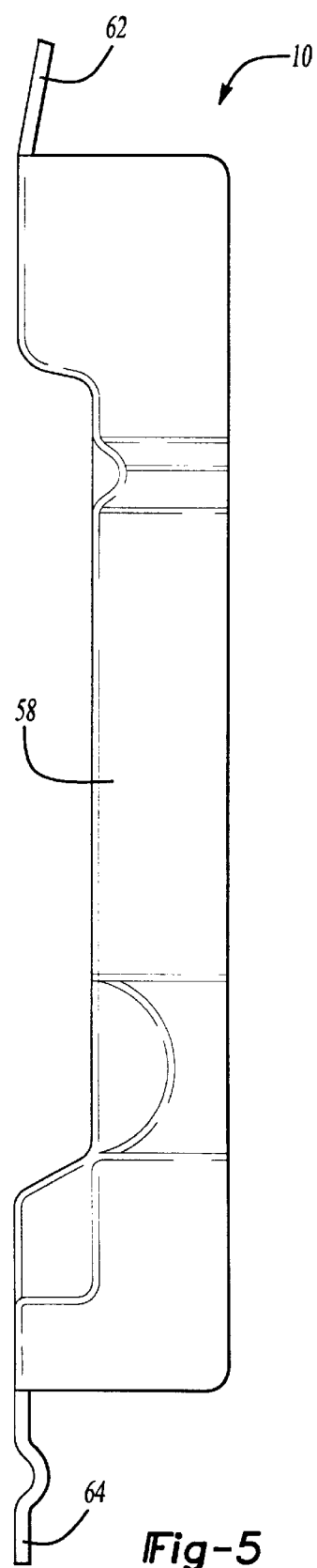
FIG. 5 is a side view of the apparatus of FIG. 4.
Figure 6:
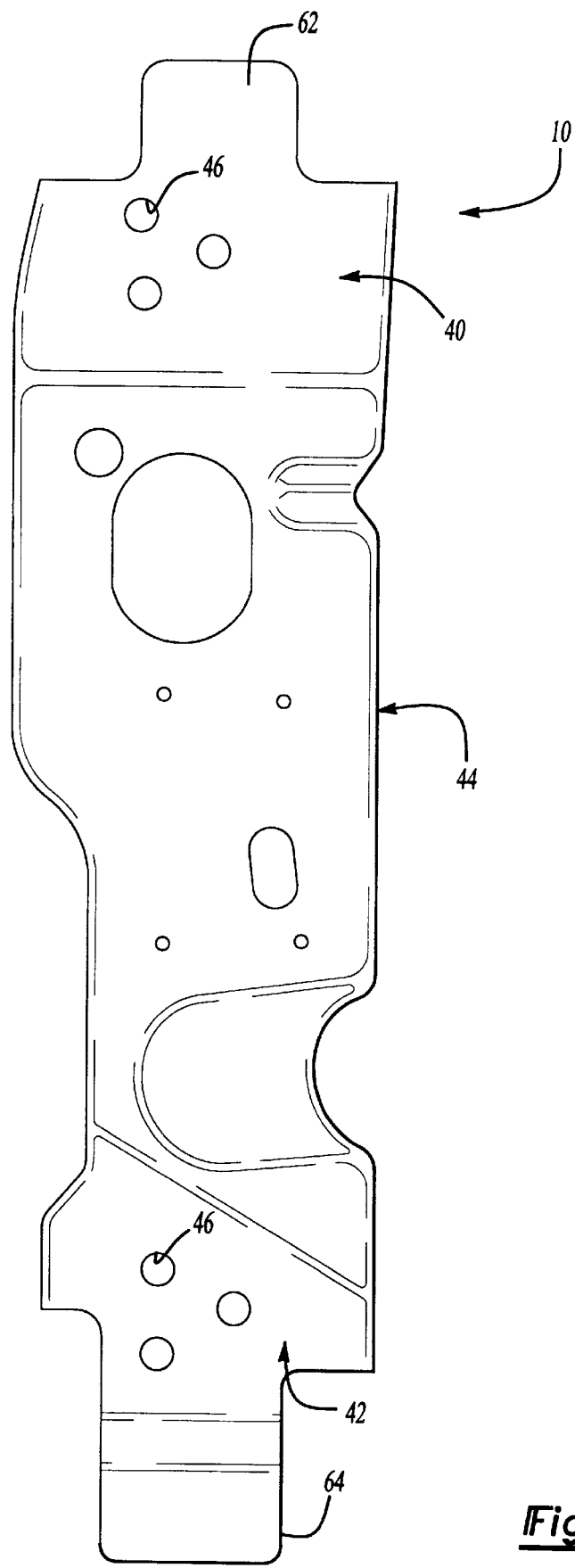
FIG. 6 is a rear view of the apparatus of FIG. 4.

With continued reference to FIGS. 1–3 and additional reference to FIGS. 4–6, the apparatus 10 of the preferred embodiment of the present invention will now be further discussed. As shown most clearly in the enlarged perspective view of FIG. 3, the apparatus 10 is attached to an inboard side 34 on the B-pillar 16 between the sill 20 and the roof line portion 22. Certain dimensions of the apparatus 10 are configured generally to the geometry of cooperating portions of the B-pillar as most clearly shown in FIG. 3.

The apparatus or reinforcement member 10 is shown to generally include first and second hinge attachment portions 40 and 42, respectively, and an intermediate portion 44 therebetween. The intermediate portion 44 is oriented generally parallel with the longitudinal axis of the vehicle 14. The first mounting portion 40 upwardly extends from the intermediate portion 44 and is formed to include a plurality of apertures 46. In the exemplary embodiment illustrated, three such apertures 46 are provided. Each of the apertures 46 are adapted to align with corresponding apertures 48 (shown in FIG. 2) and receive a fastener 50. The fasteners 50 function to interconnect a first or upper hinge 52 of a rear passenger door 54 to the body side panel 12. In a similar manner, the second hinge mounting portion 42 also includes a plurality of apertures 46 adapted to align with a corresponding plurality of apertures 48 provided in the B-pillar 16. Again, the apertures 46 and 48 are adapted to receive fasteners 50. A second hinge or lower hinge 56 of the rear door 54 is interconnected to the B-pillar 16 through the fasteners 50. The present invention further includes a plurality of weld nuts 57 (shown in FIG. 3) secured (i.e., welded) to the reinforcement member 10 and adapted to threadably receive the fasteners 50.

The reinforcement 10 is preferably illustrated to further include first and second spaced apart weld flanges 58 and 60. The first and second spaced apart flanges 58 and 60 extend in a generally inboard direction and provide a mounting surface for securing the reinforcement member 10 to the B-pillar 16 of the body side panel. In the exemplary embodiment, the first and second spaced apart sides 58 and 60 are secured to the flanges 32 and 30, respectively, of the body side panel 12. Further, in the preferred embodiment, the first and second spaced apart sides 58 and 60 are welded to the flanges 32 and 30, respectively. Alternatively, the first and second spaced apart sides 58 and 60 may be bolted or otherwise securely fastened to the flanges 32 and 30.

To provide further attachment area for securing the reinforcement member 10 to the B-pillar 16 of the body side panel 12, the reinforcement member 10 further includes first and second tabs 62 and 64. The first tab 62 upwardly extends from the first hinge mounting portion 40. Similarly, the second tab 64 downwardly extends from the second hinge mounting portion 42. In the preferred embodiment, the tabs 62 and 64 are welded or otherwise securely attached to the inboard side 34 of the B-pillar 16.

During a side impact collision, impact energy directed to the B-pillar is accommodated by the reinforcement member 10 and transferred to the vehicle chassis (not specifically shown) through the sill 20. Impact energy directed to the rear passenger door 54 follows a similar path to the chassis initially through the first and second hinge attachment portions 42 and 44.

Thus, the present invention provides a B-pillar reinforcement 10 which absorbs an increased amount of energy and reduces the amount of intrusion into the passenger compartment, thereby improving the overall energy management during a side impact collision. The reinforcement member 10 also reduces the amount of deformation typically occurring on the B-pillar inner panel and improves rear door sag.

While the above description constitutes the preferred embodiment of the invention, it will be appreciated that the invention is susceptible to modification, variation, and change without departing from the proper scope or fair meaning of the accompanying claims.

We claim:

1. In a motor vehicle having a passenger door assembly with first and second hinges and a body side panel with a B-pillar, the passenger door assembly pivotally attached with the motor vehicle, the improvement comprising:
a reinforcement member fixedly attached to the B-pillar of the body side panel, said reinforcement member including at least one hinge attachment point to which at least one of the first and second hinges is securely attached, said reinforcement member including a generally planar main body portion and a pair of spaced apart welding flanges vertically extending substantially along the entire length of the main body portion and oriented substantially perpendicular to the main body portion, the welding flanges being welded directly to the B-pillar.

2. The improvement of claim 1, wherein said at least one hinge attachment point comprises first and second hinge attachment points to which the first and second hinges are securely attached, respectively.

3. The improvement of claim 2, wherein said reinforcement member includes an intermediate portion interconnecting said first and second hinge attachment points.

4. The improvement of claim 1, wherein each of said first and second hinge attachment points includes a plurality of weld nuts.

5. The improvement of claim 1, wherein said reinforcement member is unitarily constructed from high strength steel.

6. A reinforced body side panel for a motor vehicle having a door pivotally mounted thereto through first and second hinge plates, the reinforced body side panel comprising:
a roof-line portion;
a sill portion
a B-pillar vertically interconnected with said sill portion and said roof-line portion;
a unitarily constructed reinforcement member secured to said B-pillar, said reinforcement member including first and second hinge attachment portions, the first and second hinge plates for interconnection to said first and second hinge attachment portions, respectively, said reinforcement member including a generally planar main body portion and a pair of spaced apart welding flanges vertically extending substantially along the entire length of the main body portion and oriented substantially perpendicular to the main body portion, the welding flanges being welded directly to the B-pillar.

7. The reinforced body side panel for a motor vehicle of claim 6, wherein said B-pillar includes first and second spaced apart flanges extending in an inboard direction, said reinforcement member being directly secured to said first and second spaced apart flanges.

8. The reinforced body side panel for a motor vehicle of claim 7, wherein said reinforcement member includes an intermediate portion interconnecting said first and second hinge attachment portions.

9. The reinforced body side panel for a motor vehicle of claim 6, wherein each of said first and second hinge attachment portions includes a plurality of apertures adapted to receive a fastener for securing an associated hinge thereto.

10. The reinforced body side panel for a motor vehicle of claim 6, wherein said reinforcement member further includes a first tab upwardly extending from said first hinge attachment portion and a second tab downwardly extending from said second hinge attachment portion, said first and second tabs being welded to said B-pillar.

11. The reinforced body side panel for a motor vehicle of claim 6, wherein said reinforcement member is unitarily constructed from high strength steel.

12. A motor vehicle comprising:

a body side panel including a B-pillar;

a door interconnected to said body side panel through first and second hinges; and a unitarily constructed reinforcement member attached to said body side panel, said reinforcement member including first and hinge attachment portions, said first and second hinges interconnected to said first and second hinge attachment portions, respectively, said reinforcement member including a generally planar main body portion and a pair of spaced apart welding flanges vertically extending substantially along the entire length of the main body portion and oriented substantially perpendicular to the main body portion, the welding flanges being welded directly to the B-pillar.

13. The motor vehicle of claim 12, wherein said B-pillar includes first and second spaced apart flanges extending in an inboard direction, said reinforcement member being directly secured to said first and second spaced apart flanges.

14. The motor vehicle of claim 13, wherein said reinforcement member includes an intermediate portion interconnecting said first and second hinge attachment portions.

15. The motor vehicle of claim 12, wherein said reinforcement member further includes a first tab upwardly extending from said first hinge attachment portion and a second tab downwardly extending from said second hinge attachment portion, said first and second tabs being welded to said B-pillar.

16. The motor vehicle of claim 12, wherein said reinforcement member is unitarily constructed from high strength steel.

* * * * *